Oct. 8, 1968   M. D. WOODRUFF ET AL   3,404,778
HYDROCYCLONE
Filed Nov. 18, 1964
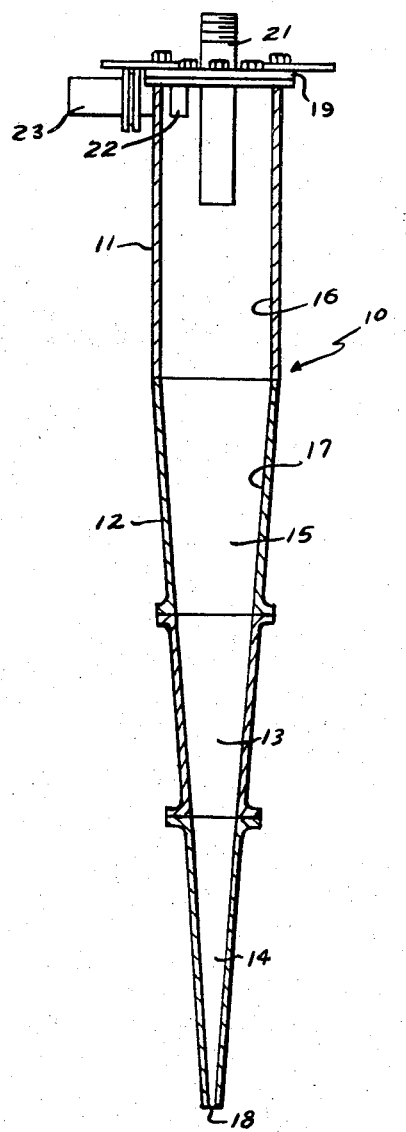
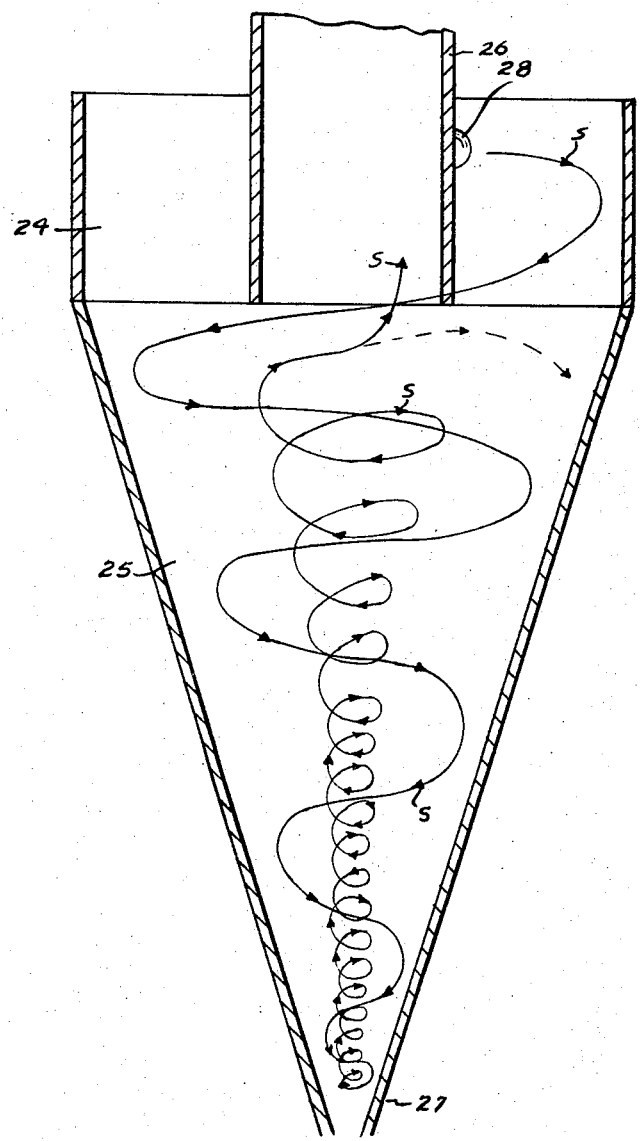
INVENTORS
MAURICE D. WOODRUFF
TIMOTHY T. COWHEY
BY Tom Walker
Jerome P. Bloom
ATTORNEYS

United States Patent Office 3,404,778
Patented Oct. 8, 1968

3,404,778
HYDROCYCLONE
Maurice D. Woodruff, Springfield, Ohio, and Timothy T. Cowhey, Brantford, Ontario, Canada, assignors to The Bauer Bros. Co., Springfield, Ohio, a corporation of Ohio
Filed Nov. 18, 1964, Ser. No. 412,117
6 Claims. (Cl. 209—211)

ABSTRACT OF THE DISCLOSURE

The method and apparatus for separating accepts from the rejects in a liquid pulp suspension characterized by the development in a proportioned cyclone of a cylindrical spiralling flow pattern and a stabilizing of the spiralling flow while maintaining the cylindrical pattern and thereafter gradually reducing the diameter of the spiralling flow to form an elongated liquid cone of small angle producing counterflowing vortices wherein that including the accepts is caused to discharge in the cylindrical section of stabilized flow while the rejects are discharged through the severely restricted apex of the cone.

---

This invention relates to hydrocyclone separators of the vortex type, and particularly to new apparatus and methods therein achieving improved separation of acceptable materials from a liquid suspension of acceptable and rejectable materials.

Although not so limited, the invention has special reference to the processing of wood pulp for paper making, a vortex type separator as described functioning to accept usable fibers from a flowing liquid suspension while rejecting "dirt." The latter term is used in a generic sense to describe various kinds of unwanted materials which find their way into a pulp slurry, such as actual foreign material, bark particles and specks, and non-disintegratable particles or undivided groups of fibers known as "shives."

A vortex type separator cleans wood pulp in a liquid suspension by subjecting it to centrifugal and other forces in a separating chamber wherein unwanted materials are sent to the wall of the chamber and progress as a part of a vortiginous flow toward a "rejects" outlet at one end of the chamber. A large part of the liquid, and fibrous material, transfers to a central counter flowing vortex and discharges through an "accepts" outlet at the other end of the chamber. The efficiency of the separator, or its ability to direct a large proportion of fiber to the accepts outlet while excluding "dirt" therefrom with a high degree of effectiveness, is known to be affected by various factors. The instant invention is concerned with a recognition of certain newly found causes for separation at less than maximum efficiency, and with improvements in the separating apparatus and method for obviating such causes.

One such cause is turbulence at the chamber inlet, which has a tangential disposition adjacent the accepts outlet, while another is a tendency for shive like particles having a specific gravity near to that of the fibers to be drawn into the central vortex and thereby to reach the accepts outlet. Both conditions result in an undue proportion of "dirt" reaching the accepts outlet along with the acceptable material. The accepts outlet has the form of a nozzle projecting axially within the separating chamber. It may be considered, therefore, that bypassing flow into the nozzle resulting from turbulence at the inlet could be avoided or lessened by increasing the length of the nozzle into a region of more stable flow. This, however, has the effect of shortening the distance between the accepts outlet and the rejects outlet. As a result, a lesser opportunity is afforded for shive particles drawn into the central vortex to free themselves therefrom prior to reaching the accepts nozzle outlet. Similarly, it may be considered that the problem of indrawn shive material could be lessened by shortennig the length of the accepts nozzle and thereby increasing the distance between the accepts outlet and the rejects outlet. Plainly, however, this is undesirable since it aggravates the condition of bypassing flow due to turbulence at the inlet.

It has been found that these seemingly irreconcilable solutions can jointly be achieved in a hydrocyclone characterized by a lengthened portion of cylindrical form joined to a conical form portion of relatively small included angle. An elongated separating chamber of such configuration stretches out the distance between the accepts and rejects outlets, appropriately increasing the opportunity for separation of unwanted particles from the central vortex, and, at the same time, provides a basis for extending the length of the accepts nozzle. In addition the relatively small included angle of the conical form portion decreases radial inward flow providing for more facile movement of shive and other "dirt" radially outward toward the separaotr chamber wall.

Accordingly, the present invention provides apparatus and a method of separating, from a liquid suspension of acceptable and rejectable materials, "dirt" particles which tend to be bypassed into the accepts outlet due to turbulence in the region of the suspension inlet, as well as dirt particles which become entrained in the central vortex and are unable to disengage themselves therefrom prior to passing out the accepts outlet.

The object of the invention is to simplify the construction as well as the means and mode of operation of hydrocyclone separators, whereby such separators may not only be economically manufactured, but will be more efficient and satisfactory in use, adaptable to a wide variety of application, and be unlikely to get out of order.

A further object of the invention is to provide a hydrocyclone separator possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 is a view in longitudinal section of a vortex type separator constructed in accordance with the concepts of the present invention; and FIG. 2 is a diagrammatic view of a vortex type separater showing the motion of a particle recirculating between the inner and outer vortices of the separator.

Like parts are indicated by similar characters of reference throughout the several views.

Referring to FIG. 1, a cylindrical-conical separator of the kind with which this invention is concerned, comprises a main body section 10 made up of a cylindrical portion 11 and a conical portion 12 in a continuing, end to end relation. For convenience the outer extremity of the conical portion 12 is constructed of detachable extensions of continuations 13 and 14. These, together with portion 11, comprise an interior separating chamber 15. Conforming to the cylindrical portion 11 and conical portions 12–14, separator chamber 15 has a cylindrical interior wall 16 and a conical interior wall 17, the latter terminating at its apex end in an opening 18 axially disposed of the body 10.

At what may be considered its outer end the cylindrical portion 11 is capped by an end closure plate 19. Disposed in the latter in a fluid tight manner is an open ended segment of pipe 21 known as a nozzle. The nozzle 21 is axially disposed of the separator body and has its opposite ends extending respectively inside and outside the chamber 15. Also at the outer end of cylindrical portion 11, adjacent to end closure plate 19, is a tangential inlet 22 for a liquid suspension. For purposes of this disclosure the suspension will be considered a wood pulp slurry comprised of acceptable cellulose fibers and rejectable "dirt" carried in liquid and delivered to the separator under pressure. A fitting 23 receives the pulp slurry and delivers it to inlet 22. The manner of delivery is such to create a vortex motion of the incoming liquid suspension whereby it whirls in a rotary sense against the wall of separator chamber 15 and progresses gradually longitudinally of the chamber toward apex outlet 18. In the process, a second vortex, centrally or inwardly of the first, is formed, the second vortex having its origin in the region of the apex opening 18 and moving counter to the first mentioned or outer vortex or in a direction toward the open inner end of nozzle 21. In accordance with the complex pattern of forces produced, "dirt" particles tend to move towards the outer wall of the separator chamber and are conducted by the outer vortex toward apex opening 18 and to be discharged therethrough. Most of the liquid, and cellulose fibers, are drawn into the inner vortex and leave the separator by way of nozzle 21. The outer end of the latter is adapted for connection in a system conducting the liquid and fibers to a place of use or to a location of subsequent treatment. Apex outlet 18 may thus be considered the rejects outlet while nozzle 21 becomes the accepts outlet. The former is orifice like in size, being substantially reduced in diameter relative to the inner diameter of nozzle 21.

In the operation of the separator, a liquid free core forms in the axis of chamber 15 and is continuous through outlet 18 and outlet 21. The outlet 18 is sized to provide an annular area surrounding such core to which the rejectable material discharges. The inner vortex increases to a maximum diameter not exceeding the inner diameter of the nozzle 21. The outer flow, assuming the character of a free vortex, increases in velocity as it progresses along the conical wall surface 17. Within the outer vortex are zones of differential speed of rotation giving rise to shear effects by which the cellulose fibers are drawn into the inner vortex. The same effect, however, causes some shive particles to be introduced into the inner vortex, particularly as the outer vortex with its heavy concentration of "dirt" approaches the rejects outlet 18. Shive particles entrained in the inner vortex in this manner may escape from the inner vortex and be re-entrained in the outer vortex but this motion is apt to be unpredictable and some particles remain in the inner vortex and exit through nozzle 21 with the accepts. In a typical flow pattern of the prior art, as shown in FIG. 2, a separator having a cylindrical portion 24, a conical portion 25 and an accepts outlet nozzle 26 aligned with the apex 27, shows a shive particle following a course S as it emerges as a part of a pulp slurry from a tangential inlet 28. As indicated, the particle is thrust into a rotary swirling motion in the separator chamber and tends through centrifugal force to assume a position at or adjacent to the outer wall of the chamber. As the separator chamber is reduced in cross-sectional area by virtue of the inwardly sloping sides thereof the particle is crowded closer to the center of the chamber and just prior to discharging through apex outlet 27 is caught up by the inner counterflowing vortex and moves reversely back toward the cylindrical portion 24 and accepts outlet 26. Under the influence of centrifugal force, and in the presence of properly conductive conditions, the shive particle may be thrown out of the inner vortex and re-entrained in the outer vortex. Unless there is sufficient time and unless a proper provision is made, however, the re-entrainment of the shive particle may not occur and it will, as indicated in full lines herein, be directed into the accepts nozzle 26 and leave the separator as a part of the acceptable material.

Further, and considering FIG. 1, the liquid suspension is delivered to the separator through inlet 22 under pressure. It has impact value upon material in the chamber, inducing rotary motion thereof. Until the liquid suspension becomes stable in its flow there are random movements of the suspension in transverse and longitudinal senses relatively to the nozzle 21. A portion of the "dirt" carried in the suspension may under these conditions be effectively bypassed into the open end of the nozzle. To avoid this the nozzle is projected through and beyond the lateral plane of the inlet 22, and the surrounding portion of the separator chamber is made cylindrical in form. It has bene found effective and desirable to utilize a substantial inward projection of the nozzle but this is limited by the length of the cylindrical portion of the separator chamber and by the undesirability of bringing about a relative approaching relationship between the nozzle 21 and rejects outlet 18.

It has been known heretofore that the forces at work in the separator chamber are affected by a number of geometrical variables. These include the area and shape of the inlet 22, as compared to the area of accepts outlet nozzle opening 21, the size of orifice outlet 18, the diameter of the separator chamber and the angle of the conical portion thereof. The instant invention finds further that the operation and efficiency of the vortex type separator is further vitally affected by the length of the cylindrical portion in relation to the diameter thereof and in relation to the cone angle. Thus it has been conventional in the past to construct the separator with a cylinder length equal to the cylinder diameter. The inward projection of the accepts nozzle sometimes equalled but did not exceed the length of the cylindrical portion.

The present finding is that by substantially increasing the length of the cylindrical portion of the separator, as to a value in the range of two to four times the cylinder diameter, very substantial improvements in efficiency are obtained, particularly if the lengthening of the cylinder is accompanied also by a lengthening of accepts nozzle 21 and in conjunction with a cone angle to a value of 10 degrees or less and preferably in the range of 5 degrees to 10 degrees. The longer cylindrical portion of the separator provides increased opportunity for stabilized flow of the incoming liquid suspension prior to its beginning passage through the conical portion. Perhaps more importantly, however, it appreciably increases the distance between the accepts outlet and the rejects orifice outlet. Increased opportunity is thus correspondingly afforded for shive particles drawn into the inner vortex in accordance with the diagram of FIG. 2 to be released therefrom and to be re-entrained in the outer vortex as indicated by the dotted extension of the diagram flow line S. Moreover, extension of the cylindrical portion of the separator provides a structure within which the accepts nozzle may be projected a further distance within the separator chamber. The extent of such projection may thus be determined empirically to enable the separator to reach its maximum separating efficiency, the accepts nozzle being made long enough to allow the liquid suspension to establish a distinct, stabilized spiral prior to passing the inner end of the nozzle. It will be understood that the increase in the length of the accepts nozzle is slight in relation to the increase in cylinder length. As shown in FIG. 1, the cylinder length is more than twice the cylinder diameter whereas the increase in length of the accepts nozzle over what might be considered normal with regard to the cylinder diameter is much less. Hence any effect the lengthening of the accepts nozzle has in regard to shortening the distance between such nozzle and orifice outlet 18 is negligible relative to the lengthening effect achieved by the longer cylinder.

The low cone angle of the separator wall 17 has the effect of lengthening the conical portion of the separator. It therefore supplements the increased cylinder length in achieving the results above discussed. Additionally the low cone angle means that the outer vortex progresses toward the rejects outlet 18 under conditions of minimum deflection or with reduced inward radial flow. As a result, and with the consequent reduction in hydraulic drag exerted upon material trying to work its way to the outer separator wall, shive particles are more readily yielded up by the inner vortex to the outer vortex and re-entrained therein to be again directed toward the rejects outlet 18. The combination of the long cylinder, allowing greater time for shive particles to free themselves from the inner vortex, with the cone wall of small included angle providing for a more facile transfer of the shive material from the inner to the outer vortex, results in an improved separating ability of the apparatus with substantial reduction in the percentage of "dirt" discharging with the accepts. The combination of these two features additionally enables use of a longer accepts nozzle as described further improving cleaning efficiency as noted.

Separator length and deflection angle of the cone have an effect on capacity or throughput, with a separator characterized as in FIG. 1 hereof having a substantially larger capacity than a corresponding unit of conventional cylinder length. In any separator of small included angle as described, to which is added the elongated cylinder concept, the effects of random shive movement as depicted in FIG. 2 will be predictably less.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described our invention, we claim:

1. A hydrocyclone including a separating chamber defined by a cylindrical wall portion and a conical extension, a base closure for said cylindrical wall portion having a centrally located opening to mount therein a tubular nozzle providing an accepts outlet and means defining a tangential inlet for introducing a liquid suspension interiorly of said cylindrical wall portion adjacent said base closure, said cylindrical wall portion being characterized by a length two to four times its diameter, said conical extension being characterized by an elongated form defining at its apex end a rejects outlet and inclining to said rejects outlet to form a cone angle not greater than about 10°, said tubular accepts nozzle consisting of an elongated tube which projects through and substantially beyond the plane of said inlet to an area of stabilized flow located intermediate the ends of said cylindrical wall portion.

2. A hydrocyclone according to claim 1 characterized by said conical extension being extended to define at its apex end a rejects outlet which is substantially reduced in diameter in respect to that of said tubular accepts nozzle.

3. A hydrocyclone as set forth in claim 2 characterized by said cone angle being limited to a range between 5° and 10°.

4. A hydrocyclone as set forth in claim 1 characterized by a cone angle of approximately 5°.

5. A method of separating accepts from the rejects in a liquid suspension comprising the steps of causing this suspension to develop a cylindrical spiralling flow pattern, stabilizing said spiralling flow while maintaining said cylindrical pattern, thereafter gradually reducing the diameter of said spiralling flow to form an elongated liquid cone including counterflowing vortices one of which includes accepts and another rejects, the angle of said cone being controlled to limit it to a maximum of 10° and the apex thereof being severely restricted in cross section, and discharging the accepts within the cylindrical section of stabilized flow and the rejects at said apex.

6. The method of separating accepts from the rejects in a liquid suspension as set forth in claim 5 characterized by controlling the liquid cone to form an angle of about 5°.

References Cited

UNITED STATES PATENTS

| 2,377,524 | 6/1945 | Samson et al. | 210—512 X |
| 2,897,972 | 8/1959 | Cannon | 209—211 X |

FOREIGN PATENTS

| 197,674 | 5/1958 | Austria. |
| 900,696 | 7/1962 | Great Britain. |

REUBEN FRIEDMAN, *Primary Examiner.*

J. ADEE, *Assistant Examiner.*